(12) United States Patent
Kassai et al.

(10) Patent No.: US 7,175,004 B2
(45) Date of Patent: Feb. 13, 2007

(54) WHEEL SIMULTANEOUS BRAKE MECHANISM AND CASTER ROTATION PREVENTING MECHANISM HAVING SIMPLE MECHANISM

(75) Inventors: Kenzou Kassai, Osaka (JP); Ichiro Ohnishi, Nara (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 10/856,702

(22) Filed: May 27, 2004

(65) Prior Publication Data

US 2005/0006185 A1  Jan. 13, 2005

(30) Foreign Application Priority Data

Jun. 6, 2003 (JP) ............................. 2003-162243
May 13, 2004 (JP) ............................. 2004-143573

(51) Int. Cl.
*B60T 1/02* (2006.01)
*B62B 9/08* (2006.01)
*F16D 65/14* (2006.01)

(52) U.S. Cl. .................... 188/31; 188/2 D; 188/19; 188/20

(58) Field of Classification Search ................ 188/17, 188/19, 20, 31, 69, 2 D; 280/642, 650, 651, 280/657, 658, 33.994; 16/18 R, 35 R
See application file for complete search history.

(56) References Cited

U.S. PATENT DOCUMENTS 2,425,574 A * 8/1947 Stewack ................. 188/20
4,567,964 A 2/1986 Kassai
4,618,033 A * 10/1986 Kassai ..................... 188/20
5,325,938 A * 7/1994 King ....................... 188/19
5,713,585 A * 2/1998 Curtis et al. ............. 188/20
5,899,469 A 5/1999 Pinto et al.
6,298,949 B1 * 10/2001 Yang et al. .............. 188/20

FOREIGN PATENT DOCUMENTS

| | | |
|---|---|---|
| CA | 1 223 907 | 7/1987 |
| DE | 35 19 855 | 12/1986 |
| DE | 93 07 172 | 9/1993 |
| DE | 200 09 693 U | 9/2000 |
| DE | 101 50 268 | 4/2003 |
| GB | 20018 | 0/1911 |
| GB | 2283791 | 5/1995 |
| GB | 2351131 | 12/2000 |
| JP | 60240566 | 11/1985 |

\* cited by examiner

*Primary Examiner*—Thomas Williams
(74) *Attorney, Agent, or Firm*—W. F. Fasse; W. G. Fasse (57) ABSTRACT

A wheel simultaneous brake mechanism for simultaneously braking two wheels includes two respective engaging members that are selectively movable between an engaged position and a disengaged position for selectively braking or releasing the two wheels. Each engaging member is biased by a spring toward its respective engaged position. The two engaging members are connected to one another in a manner transmitting a tensile force therebetween by a wire, so that the engagement or release of both engaging members can be actuated together in unison.

16 Claims, 8 Drawing Sheets

WHEEL SIMULTANEOUS BRAKE MECHANISM AND CASTER ROTATION PREVENTING MECHANISM HAVING SIMPLE MECHANISM

BACKGROUND OF THE INVENTION

1. Field of the Invention

The present invention relates to a wheel simultaneous brake mechanism and a caster rotation preventing mechanism and more particularly, it relates to a wheel simultaneous brake mechanism and a caster rotation preventing mechanism which always work on the safe side and have a simple constitution.

2. Description of the Background Art

A conventional wheel stopping apparatus is disclosed in Japanese Unexamined Patent Publication NO. 60-240566, for example. According to the conventional wheel stopping apparatus, wheel stopping mechanisms are provided at two rear wheels in a baby carriage and they are constituted so as to be moved together by a wire. Both wheel stopping mechanisms can be operated at the same time by operating an operating member provided at either one of the two rear wheels.

The conventional wheel stopping mechanism is constituted as described above. Although both wheel stopping mechanisms can be operated at the same time by operating one operating member, little consideration is given to a case where the operating member is broken or a wire or the like connected to the operating member is cut. In addition, there is a problem that a constitution of the wheel stopping mechanism is complicated and the number of parts is large so that the cost is increased.

SUMMARY OF THE INVENTION

The present invention was made in view of the above problems and it is an object of the present invention to provide a wheel simultaneous brake mechanism in which measures are taken for a case where an operating member or the like is broken, and which the construction or constitution is simple.

Another object of the present invention is to provide a caster rotation preventing mechanism in which measures taken for a case where an operating member or the like is are broken, and in which the construction or constitution is simple.

Still another object of the present invention is to provide a baby carriage having four casters whose movement is stable.

A wheel simultaneous brake mechanism for stopping a first wheel and a second wheel at the same time according to the present invention comprises first and second wheel engagement equipments provided at the first and second wheels, respectively. The first wheel engagement equipment comprises a first engaging member movable between a first position in which it engages with the first wheel and a second position in which it does not engage with the first wheel, a first spring for forcing the first engaging member to the first position, and an operating member operated to position the first engaging member at the first position or at the second position. The second wheel engagement equipment comprises a second engaging member movable between a first position in which it engages with the second wheel and a second position in which it does not engage with the second wheel and a second spring for forcing the second engaging member to the first position. The wheel simultaneous brake mechanism further comprises a connecting unit for connecting the first and second engaging members so that they are moved together in such a manner that when the operating member is operated so as to position the first engaging member at the first position, then the second engaging member may also be positioned at the first position, and when the operating member is operated so as to position the first engaging member at the second position, then the second engaging member may also be positioned at the second position, and still further comprises a position holding unit for holding the second engaging member at the second position, when the operating member is operated so as to position the first engaging member at the second position.

Since the first and the second engaging members are forced so as to engage with the first and the second wheels by the first and the second springs, even when the operating member is broken or the wire is cut, the state in which the brake is put on can be maintained. As a result, there can be provided the wheel simultaneous brake mechanism in which measures are taken for a case where the operating member or the like is broken.

Preferably, first and second wheel holding units for holding the first and second wheels are provided, and the first wheel engagement equipment is rotatably connected to the first wheel holding unit through a pin, the first wheel holding unit and the first wheel engagement equipment comprise a concave part provided on one side and a convex part provided on the other side, and the position holding unit holds the first engaging member at the second position by engagement of the concave part and the convex part.

Since the holding unit holds the first engaging member at the second position by the engagement of the concave part and the convex part, the state in which the brake is put off can be maintained with a simple constitution.

Further preferably, the connecting unit is a wire having a predetermined length so that tensile force is always provided between the first and second engaging members.

Still further preferably, two concave parts are provided on one side of the first wheel holding unit and the first wheel engagement equipment, and one of the two concave parts corresponds to the first position and the other corresponds to the second position.

Another aspect of the present invention relates to a caster rotation preventing mechanism for simultaneously stopping rotation of rotation yokes of a first caster and a second caster which each respectively comprise one of the rotation yokes which can be rotated in any direction around an axis line in the vertical direction, and a wheel rotatably supported by the rotation yoke by an axle extending in the horizontal direction. This mechanism comprises first and second caster engaging devices provided at the first and second casters, respectively. The first caster engaging device comprises a first engaging member movable between a first position in which it engages with the first caster and a second position in which it does not engage with the first caster, a first spring forcing the first engaging member to the first position, and an operating member by which the first engaging member is positioned at the first position or the second position. The second caster engaging device comprises a second engaging member movable between a first position in which it engages with the second caster and a second position in which it does not engage with the second caster, and a second spring forcing the second engaging member to the first position. The caster rotation preventing mechanism further comprises a connecting unit for connecting the first and second engaging members such that the second engaging member is also positioned at the first position when the operating member is operated so as to position the first engaging member at the first position, or the second engaging member is also positioned at the second position when the operating member is operated so as to position the first engaging member at the second position, and still further comprises a position holding unit for holding the second engaging member at the second position when the operating member is operated so as to position the first engaging member at the second position.

Since the first and the second engaging members are forced so as to engage with the first and the second casters by the first and the second springs, respectively, the caster can be held in a state in which the caster is not rotated even when the operating member is broken or the wire is cut. As a result, there can be provided a caster rotation preventing mechanism in which measures are taken for breakdown of the operating part or the like.

Preferably, the caster rotation preventing mechanism comprises first and second caster holding units for holding the first and the second casters, the first caster engaging device is rotatably connected to the caster holding unit through a pin, the first caster holding unit and the first caster engaging device have a concave part provided at one of them and a convex part provided at the other of them, and the position holding unit holds the first engaging member at the second position by engagement between the concave part and the convex part.

Further preferably, the connecting unit is a wire having a predetermined length in which tensile force is always provided between the first and the second engaging members.

Still further preferably, two concave parts are provided at one of the first caster holding unit and the first caster engaging device, and one of the two concave parts corresponds to the first position and the other corresponds to the second position.

According to still another aspect of the present invention, a baby carriage having four casters consisting of a pair of front caster and a pair of rear casters comprises a push rod by which the moving direction of the baby carriage can be changed so as to be pushed from behind or pushed from the front i.e. face-to-face, a first caster rotation stopping unit for simultaneously stopping the rotation of the pair of front casters, and a second caster rotation stopping unit for simultaneously stopping the rotation of the pair of rear casters.

Since the rotation of the pair of casters positioned on the rear side can be simultaneously stopped in either case in which the baby carriage is pushed from behind or pushed face-to-face by the push rod of the baby carriage, a stable movement can be achieved in the baby carriage having four casters.

BRIEF DESCRIPTION OF THE DRAWINGS

FIG. 2. includes a top plan view (FIG. 2A) and a side view (FIG. 2B) showing a state in which a wheel engagement equipment of the wheel simultaneous brake mechanism is mounted on one of the rear wheels of the baby carriage;

FIG. 3 includes FIGS. 3A and 3B which are each an exploded perspective view of two wheel engagement equipments connected to each other by a wire, and FIG. 3C which is a detail view of a portion of a back side of the wheel engagement equipment of FIG. 3A;

FIG. 4 is a sectional view showing essential parts of two wheel engagement equipments connected to each other by a wire in a state in which the brake is put on;

FIG. 6. includes FIGS. 6A and 6B which are views showing operation states of the two wheel engagement equipments connected to each other by the wire;

FIG. 7. includes four schematic views in FIGS. 7A, 7B, 7C and 7D showing a baby carriage according to another embodiment of the present invention; and FIG. 8 includes two views (FIGS. 8A and 8B) showing a concrete example of constitution according to another embodiment of the present invention.

DESCRIPTION OF THE PREFERRED EMBODIMENTS

Hereinafter, an embodiment of the present invention is described with reference to the drawings.

Figure 1:
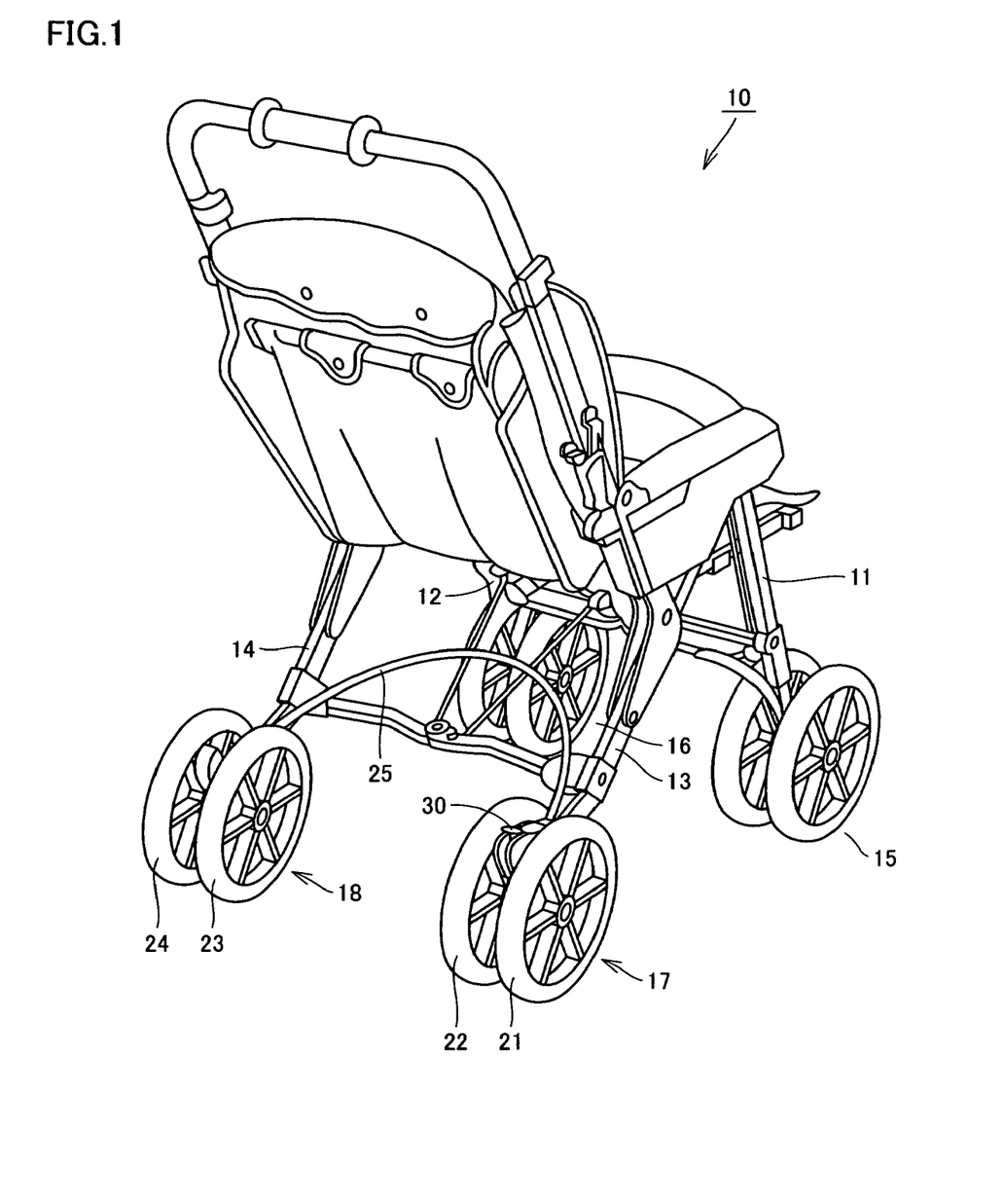
FIG. 1 is a perspective view showing a baby carriage to which a wheel simultaneous brake mechanism according to one embodiment of the present invention is applied.

FIG. 1 is a perspective rear view of a baby carriage to which a wheel simultaneous brake mechanism according to one embodiment of the present invention is applied. Referring to FIG. 1, the baby carriage comprises two front legs 11 and 12 and two rear legs 13 and 14. Front wheel units 15 and 16 and rear wheel units 17 and 18 each consisting of double wheels are rotatably provided at lower ends of the front legs 11 and 12, and the rear legs 13 and 14, respectively.

According to this baby carriage, the wheel simultaneous brake mechanism is provided at the two wheel units selected from the four wheel units 15 to 18. In general, the wheel simultaneous brake mechanism is preferably provided at the rear wheel units 17 and 18 in view of easiness of operations. Thus, a description is made of the case where the wheel simultaneous brake mechanism is provided at the rear wheel units 17 and 18 hereinafter.

As shown in FIG. 1, an operating member 30 to be described later is mounted on the rear wheel unit 17 and its operation movement is transmitted to the rear wheel Unit 18 by a wire provided in a tube 25. In addition, the rear wheel unit 17 comprises an outer rear wheel 21 and an inner rear wheel 22, and the rear wheel unit 18 comprises an outer rear wheel 24 and an inner rear wheel 23.

Figure 2A:
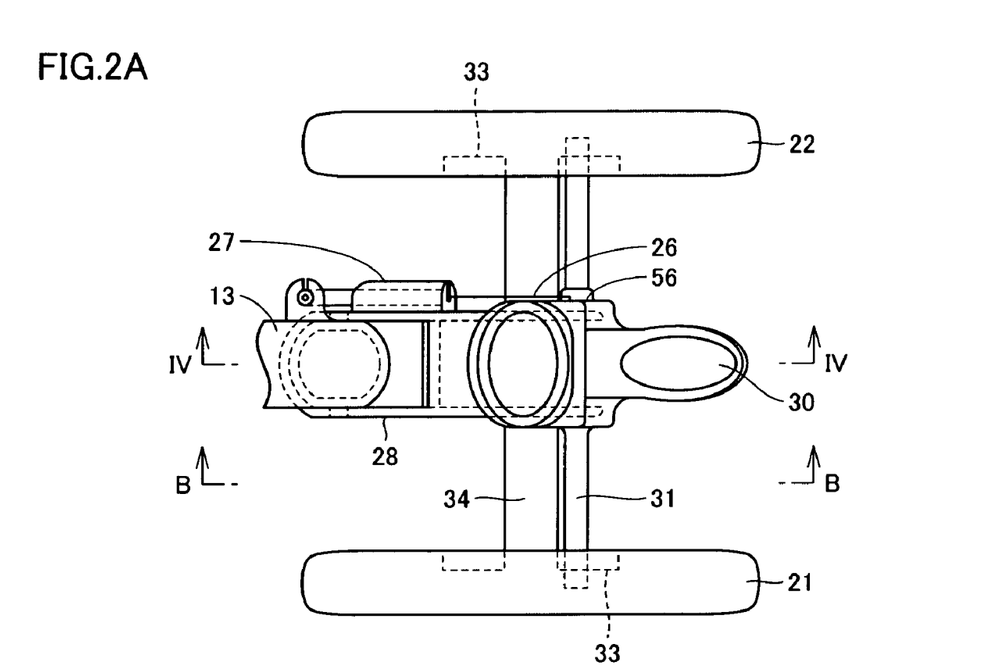
Figure 2B:
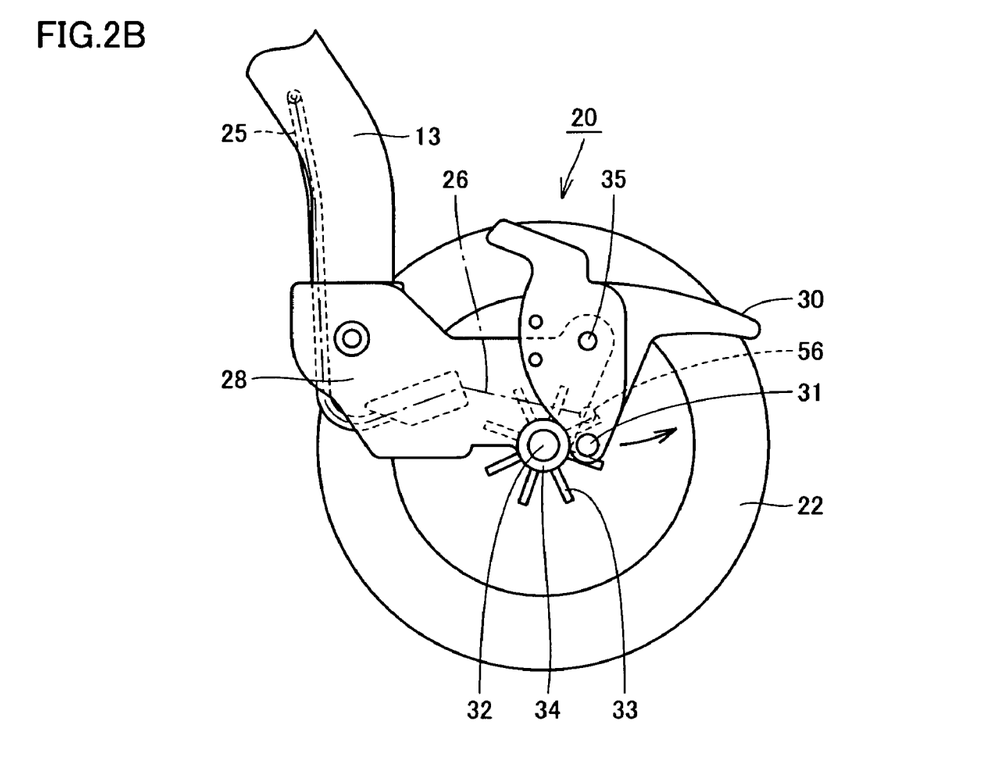

FIG. 2A is a plan view of a wheel engagement equipment 20 provided at the rear wheel unit 17 of the rear leg 13, and FIG. 2B is a view taken along line B—B in FIG. 2A. Referring to FIGS. 2A and 2B, the wheel engagement equipment 20 comprises a wheel mounting member 28 provided at a lower part of the rear leg 13, and the operating member 30 provided so as to be rotatable around the wheel mounting member 28 through a pin 35. The outer rear wheel 21 and the inner rear wheel 22 are rotatably held by an axle 32. The axle 32 is supported by a bearing part 34 provided at the wheel mounting member 28. A plurality of ribs 33 extending in the radius direction are provided around the axle 32 of the outer rear wheel 21 and the inner rear wheel 22.

The outer rear wheel 24 and the inner rear wheel 23 provided at the rear leg 14 have the same constitution as the wheels 21 and 22 basically.

FIGS. 2A and 2B show a state in which the brake is put on the outer rear wheel 21 and the inner rear wheel 22, in which a longitudinal engaging member 31 provided at the lower part of the operating member 30 engages with the ribs 33.

When the brake is put off, that is, when the baby carriage is moved, the operating member 30 is operated to be rotated around the pin 35 in the direction shown by an arrow in the drawing, to disengage the engaging member 31 from the ribs 33.

A concave part 56 (referring to FIG. 3C) for fixing a wire 26 is provided at the operating member 30 on the side of the inner rear wheel 22 in the vicinity of the engaging member 31, and the wire 26 extends to a driven member to be described later with reference to the rear leg 14, through a wire guide 27. In addition, the wire 26 is guided by a tube 25. The operating member 30 has a configuration so as to be easily operated in rotating the member 30 around the pin 35 by a foot as shown in FIG. 2.

Figure 3A:
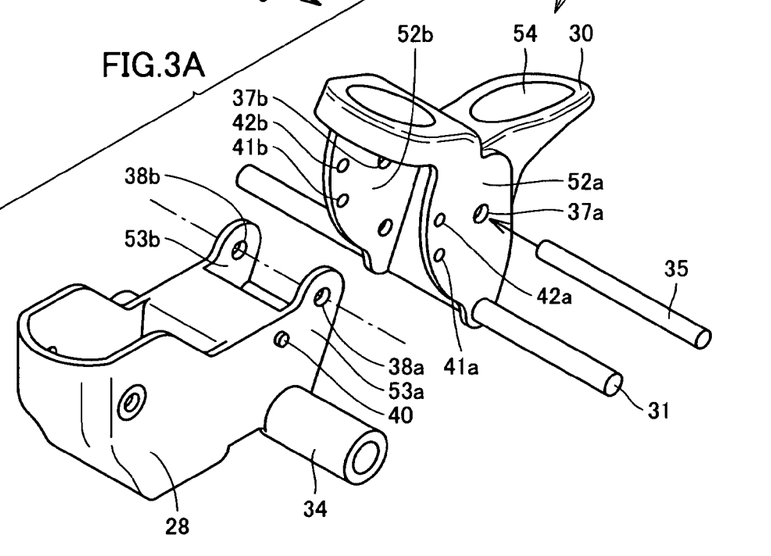
Figure 3B:
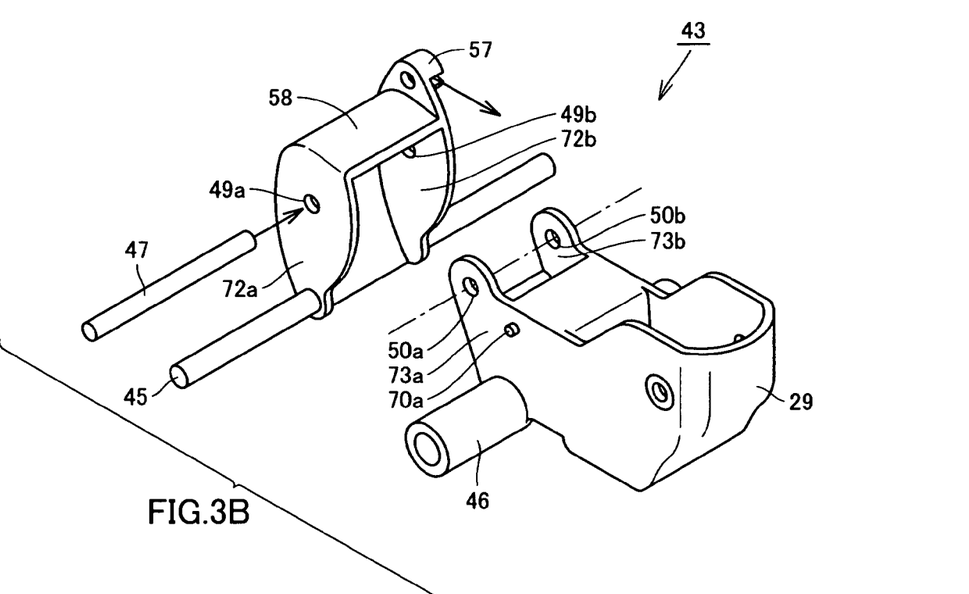

FIG. 3A is an exploded perspective view of the wheel engagement equipment 20 on the side of the rear leg 13, and FIG. 3B is an exploded perspective view of a wheel engagement equipment 43 on the side of the rear leg 14. Referring to FIG. 3A, the operating member 30 and the wheel mounting member 28 which constitute the wheel engagement apparatus 20 are connected by passing the pin 35 through pierced holes 37a and 37b provided in the opposed walls 52a and 52b of the operating member 30, and through pierced holes 38a and 38b provided in the opposed walls 53a and 53b of the wheel mounting member 28.

The operating member 30 and the engaging member 31 are integrally constituted. Pierced holes 41a and 41b and pierced holes 42a and 42b, whose usage is described later, are provided in the opposed walls 52a and 52b of the operating member 30. In addition, projections 40 which engage with the pierced holes 41a and 41b, and the pierced holes 42a and 42b are provided on an outer face of the opposed walls 53a and 53b of the wheel mounting member 28. The wheel mounting member 28 and the bearing part 34 rotatably holding the axle 32 are integrally constituted.

Referring to FIG. 3B, the wheel engagement equipment 43 on the side of the rear wheel 14 consists of a wheel mounting member 29 and a driven member 58 which is operated in accordance with the operation of the operating member 30, similar to the wheel engagement equipment 20 on the side of the rear leg 13. The driven member 58 is connected to the wheel mounting member 29 so as to be rotatable around a pin 47, by passing the pin 47 through pierced holes 50a and 50b provided in a pair of opposed walls 73a and 73b of the wheel mounting member 29 and pierced holes 49a and 49b provided in a pair of walls 72a and 72b of the driven member 58. In addition, projections 70a and 70b, whose function is to be described later, are provided at predetermined positions outside of the opposed walls 73a and 73b of the wheel mounting member 29.

The driven member 58 and an engaging member 45 are integrally constituted. On top of the wall 49b of the driven member 58, there is provided a concave part 57 having a side wall, for holding an opposite end of the wire 26 mounted on the concave part 56 of the operating member 30 (referring to FIG. 4).

Figure 3C:
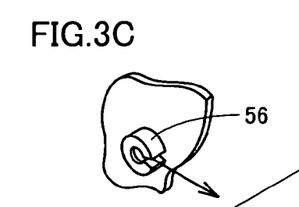

FIG. 3C is a view showing a configuration of the concave part 56 having a side wall, which is provided on a back face of the wall 52b shown in FIG. 3A and described in FIG. 2. The cylindrical end of the wire 26 is housed in the concave part 56.

Figure 4:
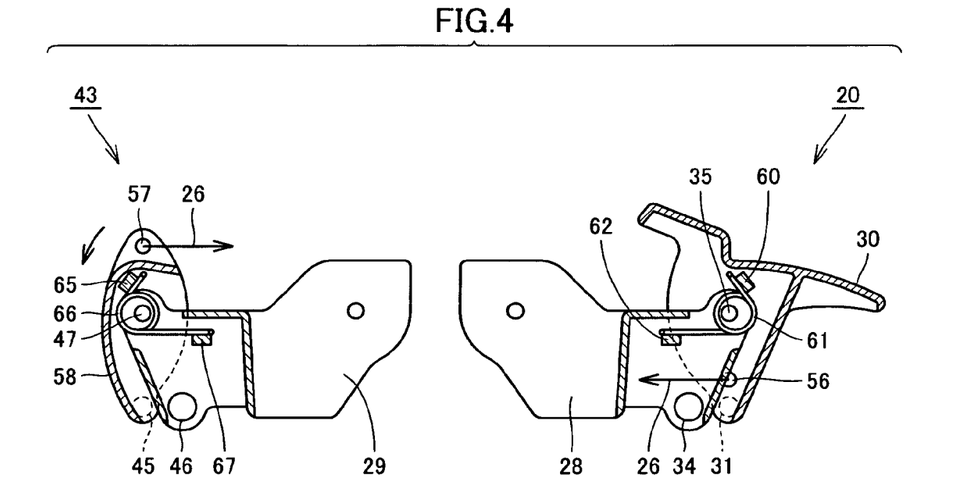

FIG. 4 is a view showing essential parts of inner structures of the wheel engagement equipment 20 on the side of the rear leg 13 and the wheel engagement equipment 43 on the side of the rear leg 14. The view of the wheel engagement equipment 20 corresponds to a sectional view taken along line IV—IV in FIG. 2A.

Referring to FIG. 4, when the operating member 30 and the wheel mounting member 28 are connected through the pin 35, a spring 61 held by the pin 35 is pressed by a locking part 60 on the operating member side which is fixed to the operating member 30 and a locking part 62 on the wheel mounting member side which is fixed to the wheel mounting member 28 in the inside. In other words, by the spring 61, the operating member 30 is always forced such that the engaging member 31 may engage with the ribs 33 as shown in FIG. 2B, and in this state, the brake is put on the wheels.

Similar to the wheel engagement equipment 20, according to the wheel engagement equipment 43, when the driven member 58 and the wheel mounting member 29 are connected through the pin 47, a spring 66 held by the pin 47 is pressed by a locking part 65 of the driven member side which is fixed to the driven member 58 and a locking part 67 on the wheel mounting member side which is fixed to the wheel mounting member 29. In other words, by the spring 66, the driven member 58 is always forced to come close to or pivot toward the bearing 46 of the wheel mounting member 29 as shown by an arrow in FIG. 4, so that the engaging member 45 provided at the lower end thereof may engage with ribs (not shown) provided around the axle of the outer rear wheel 24 and the inner rear wheel 23 of the rear leg 14, and in this state, the brake is engaged or put on the wheels of the rear leg 14.

Meanwhile, in this state, the other end of the wire 26 whose one end is held by the concave part 56 of the operating member 30 is housed in the concave part 57 of the driven member 58. A length of the wire 26 is provided such that the operating member 30 and the driven member 58 are pulled to each other with tensile force without slack as shown by an arrow in the drawing.

Thus, since both operating member 30 and the driven member 58 are constituted such that the respective engaging members 31 and 45 may engage with the corresponding ribs 33, the state where the brake is put on is still maintained in the event that the operating member 30 is broken or the wire 26 is cut, which is safe.

In addition, even when the wire 26 is removed, since the operating member 30 of the wheel engagement equipment 20 and the driven member 58 of the wheel engagement equipment 43 are both forced in the direction in which the brake is put on or engaged by the springs 61 and 66, the state can be maintained even after the wire 26 was removed. Therefore, maintenance can be easily performed in the state in which the wire 26 is removed.

Furthermore, as shown in FIGS. 2 and 3, since both ends of the wire 26 are mounted on the concave parts 56 and 57 on the outer walls of the operating member 30 and the driven member 58 on the sides of the inner rear wheels 22 and 24, respectively, the wire 26 can be easily removed. In this respect also, the maintenance can be easily performed.

Figure 5:
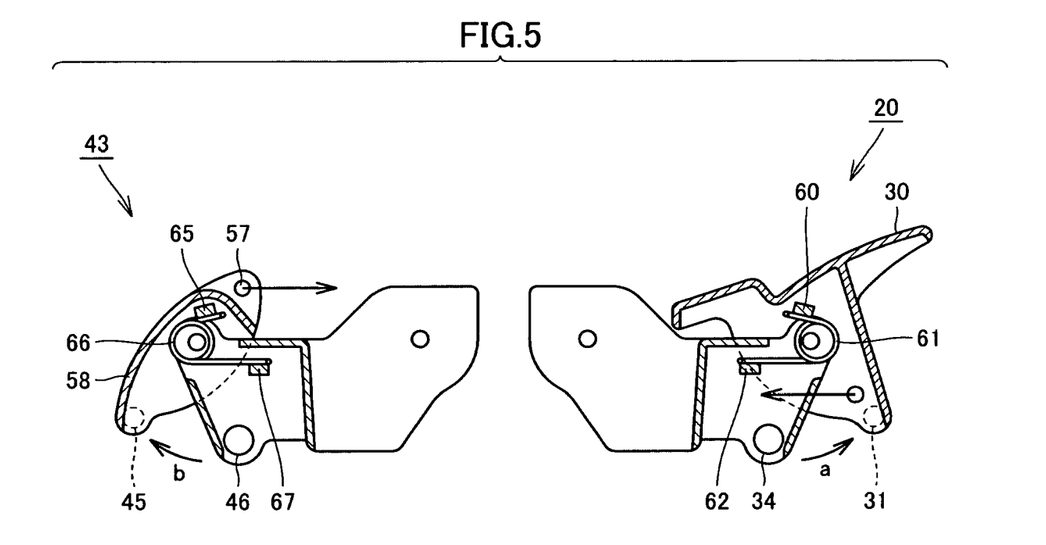
FIG. 5 is a sectional view showing essential parts of the two wheel engagement equipments connected to each other by the wire in a state in which the brake is put off.

FIG. 5 is a view showing a state in which the operating member 30 is operated against the force of the spring 61 to separate the engaging member 31 from the bearing part 34 on the side of the wheel engagement equipment 20 as shown by an arrow "a" in the drawing so as not to engage with the ribs 33. At this time, the concave part 57 of the driven member 58 is pulled by the wire 26 in the direction shown by an arrow in the drawing and the driven member 58 is also moved against the force of the spring 66 as shown by an arrow "b" in the drawing. Thus, the engaging member 45 is separated from the ribs of the outer rear wheel 24 and the inner rear wheel 23. As a result, the outer rear wheel 21 and the inner rear wheel 22 of the rear leg 13 and the outer rear wheel 24 and the inner rear wheel 23 of the rear leg 14 can be rotated.

Figure 6A:
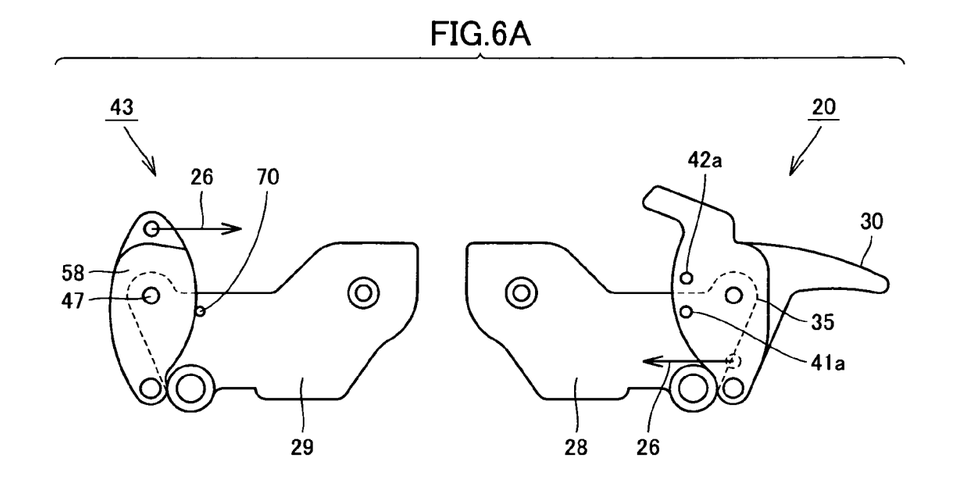
Figure 6B:
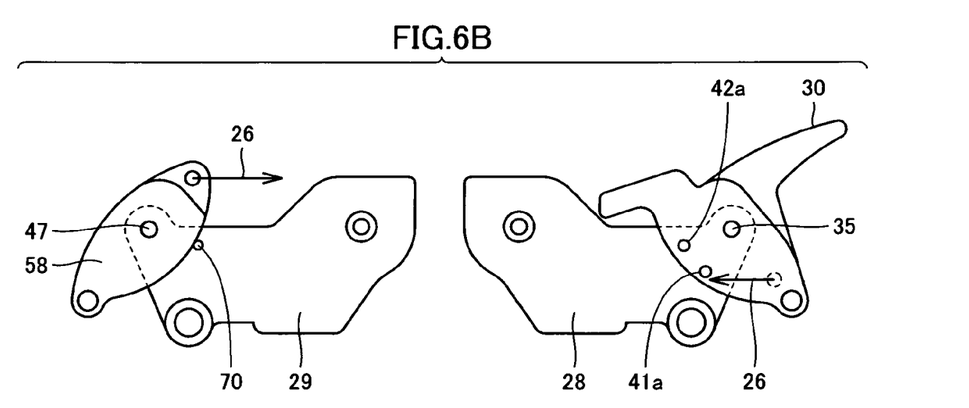

FIG. 6 is a view showing operational states of the wheel engagement equipment 20 on the side of the rear leg 13 and the wheel engagement equipment 43 on the side of the rear leg 14 in which FIG. 6A shows a state in which the brake is engaged or put on and FIG. 6B shows a state in which the brake is disengaged or put off. When the brake is put on, the projection 40 (referring to FIG. 3A) provided at the wheel mounting member 28 engages with the positioning hole 41a for a stopped state, and when the brake is put off, it engages with the positioning hole 42a for a moving state (in addition, although the front side is shown only, the same engagement is made also on the opposite side).

Thus, since the state in which the brake is put on the wheels and the state in which the brake is put off the wheels are maintained by engagement of the projections and the positioning holes, the state in which the brake is put on and the state in which the brake is put off can be maintained with a simple constitution.

Meanwhile, the driven member 58 is pulled by the wire 26 in the direction shown by the arrow in the drawing and rotated around the pin 47. At this time, since a projection 70 which follows an outer periphery of the driven member 58 is provided at the wheel mounting member 29, the driven member 58 can be smoothly rotated.

Although the description was made of the example in which the wheel simultaneous brake mechanism is provided at the pair of rear wheels of the baby carriage in the above embodiment, the present invention is not limited to this. The wheel simultaneous brake mechanism can be applied to any two wheels of the baby carriage or a mobile object having a plurality of wheels other than the baby carriage.

Although the brake is put on the wheels in such a manner that the engaging member engages with ribs radiating from the axle in the above embodiment, the present invention is not limited to this and it may engage with a member provided at an arbitrary position of the axle.

Although the description was made of the case where the coil spring is used as a spring in the above embodiment, the present invention is not limited to this and another type of spring may be used.

Next, a description is made of another embodiment of the present invention. According to this embodiment, when four casters are provided as wheels of a baby carriage, the above mechanism is employed as a rotation preventing mechanism of two rear casters among the four casters of the baby carriage in the moving direction.

FIG. 7 is a schematic view of the baby carriage shown in FIG. 1. FIG. 7A is a schematic view showing an arrangement of the wheels when pushed face-to-face, FIG. 7B is a view (schematic side view) taken in the direction of arrows B in FIG. 7A, FIG. 7C is a schematic view showing an arrangement of the wheels when pushed from behind, and FIG. 7D is a view (schematic side view) taken in the direction of arrows D in FIG. 7C.

Here, four wheel units 15 to 18 of a baby carriage 10 are all casters having rotation yokes 91 and 94. Thus, when all of the wheel units of the baby carriage are casters, the moving direction of the baby carriage can be changed over between a state pushed from behind (FIGS. 7C and 7D) and a state pushed face-to-face (FIGS. 7A and 7B) only by switching a push rod 80 of the baby carriage 10 as shown in FIG. 7B or 7D, so that the baby carriage can be moved in any direction.

However, when all of the four wheels of the baby carriage 10 are casters, the traveling path of the baby carriage 10 meanders. In order to avoid such meandering movement, it is necessary to prevent the rotation of the wheels positioned at the back of the baby carriage 10 in the moving direction. Thus, according to this embodiment, the mechanism described above is used as a mechanism for preventing the rotation of the casters positioned at the back of the baby carriage 10 in the moving direction.

Figure 7A:
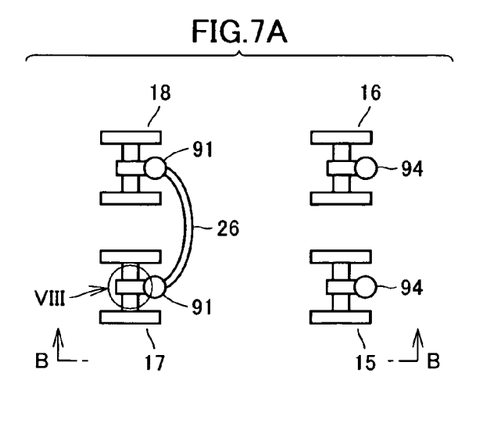
Figure 7B:
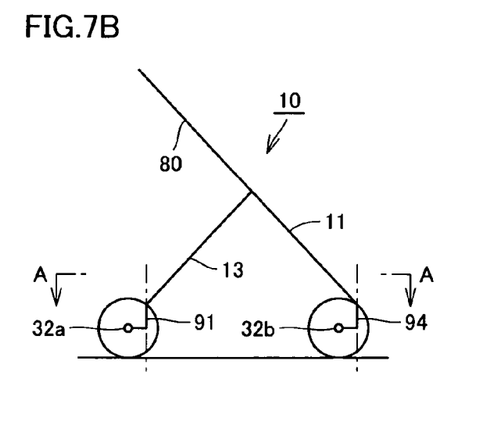
Figure 7C:
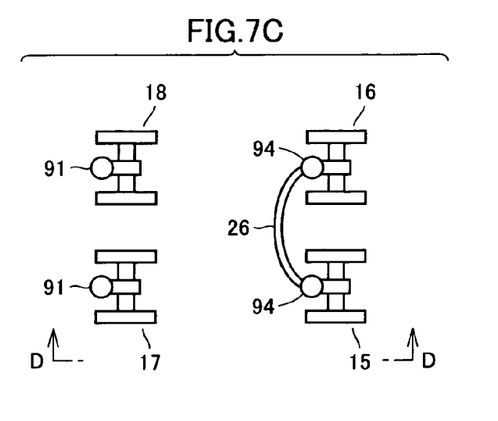
Figure 7D:
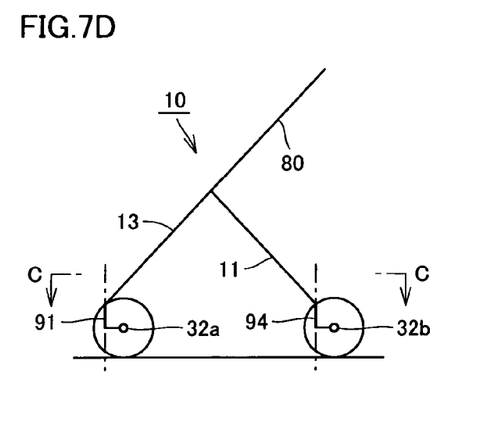

Referring to FIGS. 7A and 7B, in the case of the state pushed face-to-face, the wheel units 17 and 18 positioned backward in the moving direction are held so as to be positioned in a predetermined relation with each other by a wire 26, in order to prevent the casters of the wheel units 17 and 18 from rotating around the rotation yoke 91.

Figure 8A:
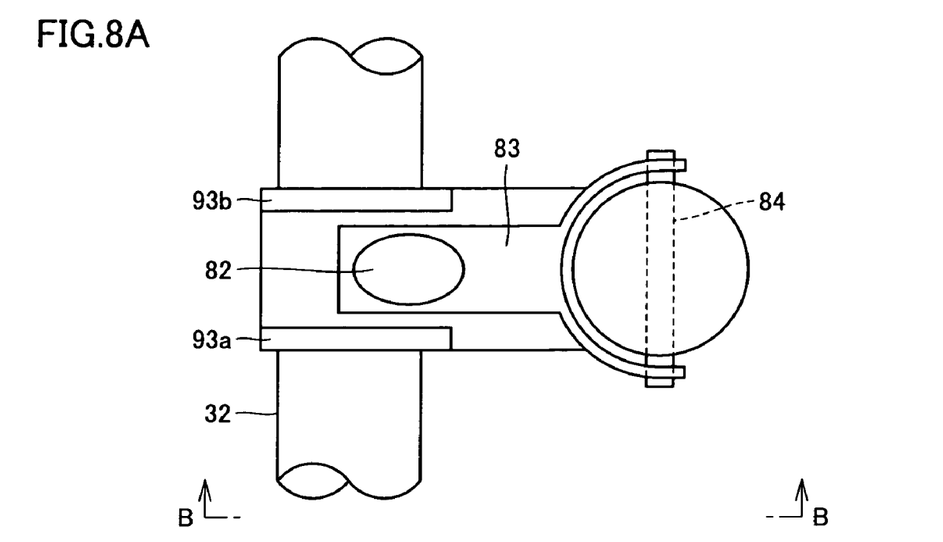
Figure 8B:
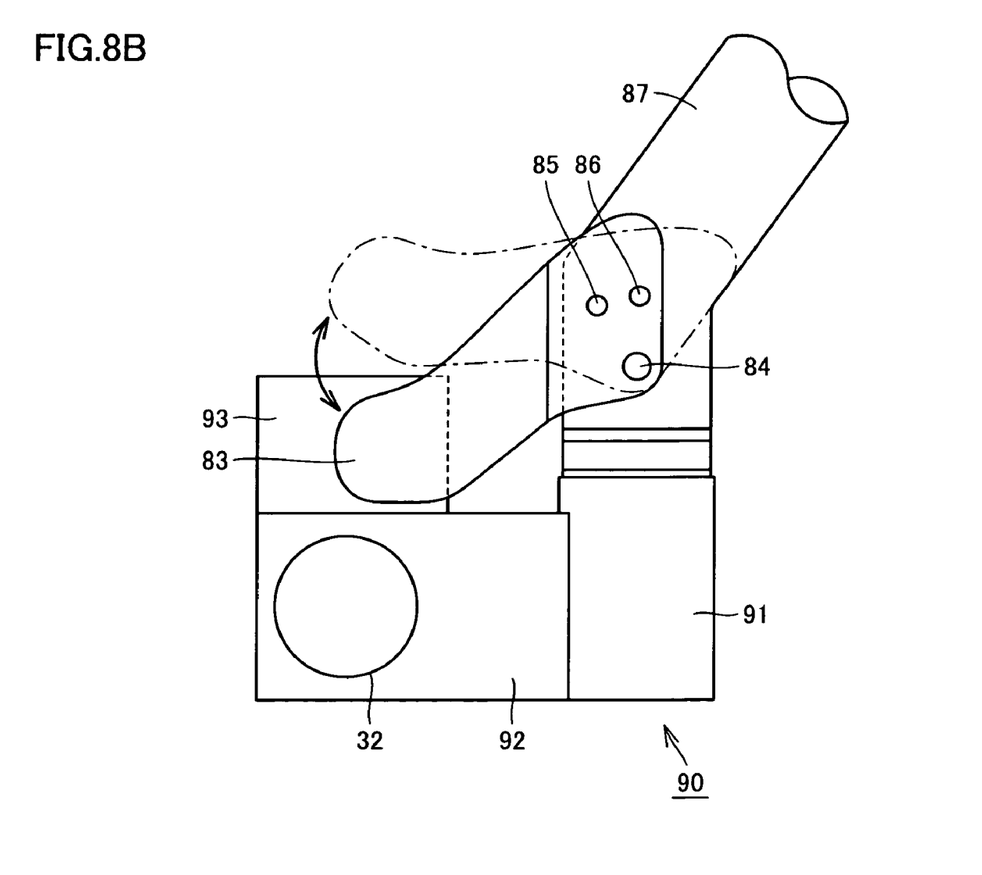

FIG. 8A is an enlarged view of a part shown by VIII in FIG. 7A and FIG. 8B is a side view taken in the direction of the arrows B in FIG. 8A.

Referring to FIGS. 8A and 8B, a wheel part comprises a caster holding member 87 (which corresponds to the wheel mounting member 28 in the prior embodiment), an engaging member 83 rotatably held by the caster holding member 87 through a pin 84, and a caster 90 held by the caster holding member 87.

The caster 90 comprises a rotation yoke 91, a supporting part 92 held by the rotation yoke 91, for supporting an axle 32, and a pair of rotation stopping members 93a and 93b provided at an upper part of the supporting part 92.

The position of the engaging member 83 can be changed by an operating member 82. When the engaging member 83 is moved around the pin 84 in the lower direction of an arrow in FIG. 8B, the engaging member 83 is positioned between the pair of rotation stopping members 93a and 93b to prevent the caster 90 or particularly the axle supporting part 92 from rotating about the rotation yoke 91. Meanwhile, when the engaging member 83 is moved around the pin 84 in the upper direction shown by the arrow in FIG. 8B, the engaging member 83 is separated from the rotation stopping members 93a and 93b and the axle supporting part 92 can be rotated in any direction by or about the rotation yoke 91.

In addition, similar to the prior embodiment, the engaging member 83 comprises a spring forcing the engaging member 83 in the lower direction shown by the arrow and a wire and the like as the connecting unit although they are not shown.

In addition, the engaging member 83 comprises two concave parts 85 and 86 provided at a position in which the rotation of the caster 90 is prevented and at a position in which the rotation of the caster 90 is allowed, respectively. A convex part (not shown) is provided in the caster holding member 87 so as to correspond to the two concave parts 85 and 86. These concave and convex parts may be provided other way round.

Furthermore, the position of the engaging member 83 may be changed by setting the operating member 82 by hand or by moving the operating member 82 in a synchronized manner with the position of the push rod.

Although one embodiment of the present invention was described with reference to the drawings, the present invention is not limited to the illustrated embodiment only. Various kinds of modifications can be added to the illustrated embodiment within the same scope as that of the present invention or the equivalent scope as that.

What is claimed is:

1. A wheel simultaneous brake mechanism for stopping a first wheel and a second wheel at the same time, comprising:
   a first wheel engagement equipment provided at said first wheel and comprising:

a first engaging member movable between a first engaged position in which said first engaging member engages with said first wheel and a first disengaged position in which said first engaging member does not engage with said first wheel, and a first spring arranged to urge said first engaging member to said first engaged position;

an operating member connected to said first engaging member and operable to position said first engaging member selectively at said first engaged position and at said first disengaged position;

a second wheel engagement equipment provided at said second wheel and comprising:

a second engaging member movable between a second engaged position in which said second engaging member engages with said second wheel and a second disengaged position in which said second engaging member does not engage with said second wheel, and a second spring arranged to urge said second engaging member to said second engaged position;

a connecting wire that connects said first and second engaging members directly to each other through said connecting wire in such a manner that when said operating member is operated so as to position said first engaging member at said first engaged position then said second engaging member is positively positioned at said second engaged position, and when said operating member is operated so as to position said first engaging member at said first disengaged position then said second engaging member is positively positioned at said second disengaged position, wherein said connecting wire is arranged in a tube and is connected and positively linked without any interposed spring to first and second connection portions that are integral and unitary with said first and second engaging members respectively, so that said connecting wire establishes a fixed predetermined length between said first and second connection portions so that a tensile force is always provided through said wire between said first and second engaging members; and a position holding device arranged and adapted to hold said second engaging member at said second disengaged position, when said operating member is operated so as to position said first engaging member at said first disengaged position;

wherein said wire in said tube is arranged and connected so that by operating said operating member, said wire is operated so that said first and second springs urge said first and second engaging members to said first and second engaged positions.

2. The wheel simultaneous brake mechanism according to claim 1, further comprising first and second wheel holding means for holding said first and second wheels, wherein said first wheel engagement equipment is rotatably connected to said first wheel holding means through a pin, said first wheel holding means and said first wheel engagement equipment comprise a concave part provided on one side and a convex part provided on the other side, and said position holding device is arranged and adapted to hold said first engaging member at said first disengaged position by engagement of said concave part and said convex part.

3. The wheel simultaneous brake mechanism according to claim 2, wherein two said concave parts are provided on said one side of said first wheel holding means and said first wheel engagement equipment, and one of said two concave parts is located to correspond to said first engaged position and the other of said two concave parts is located to correspond to said first disengaged position.

4. The wheel simultaneous brake mechanism according to claim 1, wherein said operating member is unitary with said first engaging member.

5. The wheel simultaneous brake mechanism according to claim 1, wherein, relative to a first axis about which said first engaging member is pivotable between said first engaged position and said first disengaged position, said first connection portion where said connecting wire is connected to said first engaging member is on a same first side of said first engaging member from said first axis as a first engaging part of said first engaging member that engages said first wheel in said first engaged position, and wherein, relative to a second axis about which said second engaging member is pivotable between said second engaged position and said second disengaged position, said second connection portion where said connecting wire is connected to said second engaging member is on an opposite second side of said second engaging member from said second axis as compared to a second engaging part of said second engaging member that engages said second wheel in said second engaged position.

6. A wheel simultaneous stop mechanism for stopping first and second components of first and second wheel assemblies at the same time, comprising:

a first engagement equipment provided at said first component of said first wheel assembly and comprising:

a first engaging member movable between a first engaged position in which said first engaging member engages with said first component of said first wheel assembly and a first disengaged position in which said first engaging member does not engage with said first component of said first wheel assembly, and a first spring arranged to urge said first engaging member to said first engaged position;

an operating member connected to said first engaging member and operable to position said first engaging member selectively at said first engaged position and at said first disengaged position;

a second engagement equipment provided at said second component of said second wheel assembly and comprising:

a second engaging member movable between a second engaged position in which said second engaging member engages with said second component of said second wheel assembly and a second disengaged position in which said second engaging member does not engage with said second component of said second wheel assembly, and a second spring arranged to urge said second engaging member to said second engaged position;

a connecting wire that connects said first and second engaging members directly to each other through said connecting wire in such a manner that when said operating member is operated so as to position said first engaging member at said first engaged position then said second engaging member is positively positioned at said second engaged position, and when said operating member is operated so as to position said first engaging member at said first disengaged position then said second engaging member is positively positioned at said second disengaged position, wherein said connecting wire is arranged in a tube and is connected and positively linked without any interposed spring to first and second connection portions that are integral and unitary with said first and second engaging members respectively, so that said connecting wire establishes a fixed predetermined length between said first and second connection portions so that a tensile force is always provided through said wire between said first and second engaging members; and a position holding device arranged and adapted to hold said second engaging member at said second disengaged position, when said operating member is operated so as to position said first engaging member at said first disengaged position;

wherein said wire in said tube is arranged and connected so that by operating said operating member, said wire is operated so that said first and second springs urge said first and second wheel engaging members to said first and second engaged positions.

7. The wheel simultaneous stop mechanism according to claim 6, wherein said first and second components are first and second wheels of said first and second wheel assemblies.

8. The wheel simultaneous stop mechanism according to claim 7, being a wheel simultaneous brake mechanism, wherein said first and second engagement equipments are first and second wheel engagement equipments provided respectively at said first and second wheels of said first and second wheel assemblies.

9. The wheel simultaneous stop mechanism according to claim 8, further comprising first and second wheel holding means for holding said first and second wheels, wherein said first wheel engagement equipment is rotatably connected to said first wheel holding means through a pin, said first wheel holding means and said first wheel engagement equipment comprise a concave part provided on one side and a convex part provided on another side, and said position holding device is arranged and adapted to hold said first engaging member at said first disengaged position by engagement of said concave part and said convex part.

10. The wheel simultaneous stop mechanism according to claim 9, wherein two said concave parts are provided on said one side of said first wheel holding means and said first wheel engagement equipment, and one of said two concave parts is located to correspond to said first engaged position and another of said two concave parts is located to correspond to said first disengaged position.

11. The wheel simultaneous stop mechanism according to claim 6, wherein said operating member is unitary with said first engaging member.

12. The wheel simultaneous stop mechanism according to claim 6, wherein, relative to a first axis about which said first engaging member is pivotable between said first engaged position and said first disengaged position, said first connection portion where said connecting wire is connected to said first engaging member is on a same first side of said first engaging member from said first axis as a first engaging part of said first engaging member that engages said first component of said first wheel assembly in said first engaged position, and wherein, relative to a second axis about which said second engaging member is pivotable between said second engaged position and said second disengaged position, said second connection portion where said connecting wire is connected to said second engaging member is on an opposite second side of said second engaging member from said second axis as compared to a second engaging part of said second engaging member that engages said second component of said second wheel assembly in said second engaged position.

13. A wheel braking arrangement comprising:

a first wheel mounting member rotatably carrying a first wheel assembly to be rotatable about a first rotation axis ;

a second wheel mounting member rotatably carrying a second wheel assembly to be rotatable about a second rotation axis;

a first brake arrangement including a first pivotal lever that is pivotally connected about a first pivot axis to said first wheel mounting member, a first wheel engaging member connected to said first pivotal lever so as to be pivotable with said first pivotal lever between a first engaged position in which said first wheel engaging member engages a first portion of said first wheel assembly to block rotation of said first wheel assembly about said first rotation axis and a first disengaged position in which said first wheel engaging member is disengaged from said first portion of said first wheel assembly to permit rotation of said first wheel assembly about said first rotation axis, and a first spring pivotally biasing said first pivotal lever relative to said first wheel mounting member about said first pivot axis so as to pivot said first pivotal lever and said first wheel engaging member toward said first engaged position;

an operating member operatively connected to said first pivotal lever and operable to pivot said first pivotal lever and said first wheel engaging member to said first disengaged position upon application of an operating force to said operating member against a biasing force exerted by said first spring;

a second brake arrangement including a second pivotal lever that is pivotally connected about a second pivot axis to said second wheel mounting member, a second wheel engaging member connected to said second pivotal lever so as to be pivotable with said second pivotal lever between a second engaged position in which said second wheel engaging member engages a second portion of said second wheel assembly to block rotation of said second wheel assembly about said second rotation axis and a second disengaged position in which said second wheel engaging member is disengaged from said second portion of said second wheel assembly to permit rotation of said second wheel assembly about said second rotation axis, and a second spring pivotally biasing said second pivotal lever relative to said second wheel mounting member about said second pivot axis so as to pivot said second pivotal lever and said second wheel engaging member toward said second engaged position; and a wire under tension connecting said first and second pivotal levers to one another, wherein said wire is arranged in a tube and is connected positively without any interposed spring to said first pivotal lever at a first connection point located so that a tension of said wire acts without play on said first pivotal lever in a first pivoting direction toward said first engaged position about said first pivot axis, wherein said wire is further connected positively without any interposed spring to said second pivotal lever at a second connection point located so that said tension of said wire acts without play on said second pivotal lever in a second pivoting direction toward said second disengaged position about said second pivot axis, wherein said wire is arranged and adapted to transmit a pulling force from said first pivotal lever to said second pivotal lever so as to positively force said second pivotal lever to said second disengaged position when said first pivotal lever is pivoted to said first disengaged position upon application of said operating force to said operating member, and wherein said wire in said tube is arranged and connected so that by operating said operating member, said wire is operated so that said first and second springs urge said first and second engaging members to said first and second engaged positions.

14. The wheel braking arrangement according to claim 13, wherein said wire and said first and second springs are arranged so that when said operating member is operated so as to position said first wheel engaging member at said first engaged position then said second wheel engaging member is positively positioned at said second engaged position, and when said operating member is operated so as to position said first wheel engaging member at said first disengaged position then said second wheel engaging member is positively positioned at said second disengaged position, and wherein said wire establishes a fixed predetermined length between said first and second connection points so that a tensile force is always provided through said wire between said first and second wheel engaging members.

15. The wheel braking arrangement according to claim 13, wherein said operating member is unitary with said first wheel engaging member.

16. The wheel braking arrangement according to claim 13, wherein, relative to said first pivot axis, said first connection point where said wire is connected to said first pivotal lever is on a same first side of said first pivotal lever from said first pivot axis as said first wheel engaging member, and wherein, relative to said second pivot axis, said second connection point where said wire is connected to said second pivotal lever is on an opposite second side of said second pivotal lever from said second pivot axis as compared to said second wheel engaging member.

* * * * *

UNITED STATES PATENT AND TRADEMARK OFFICE
CERTIFICATE OF CORRECTION

PATENT NO. : 7,175,004 B2
APPLICATION NO. : 10/856702
DATED : February 13, 2007
INVENTOR(S) : Kassai et al.

It is certified that error appears in the above-identified patent and that said Letters Patent is hereby corrected as shown below:

Title page,
Item [56], References Cited, FOREIGN PATENT DOCUMENTS,
Line 6, after "20018", replace "0/1911" by --7/1911--;

Column 1,
Line 41, after "and", insert --in--;
Line 44, after "measures", insert --are--;
Line 45, after "is", delete "are";

Column 3,
Line 39, after "front", replace "caster" by --casters--;

Column 4,
Line 41, after "wheel", replace "Unit" by --unit--;

Column 12,
Line 7, replace "axis ;" by --axis;--.

Signed and Sealed this

Third Day of July, 2007

JON W. DUDAS
*Director of the United States Patent and Trademark Office*